United States Patent
Kassabov et al.

(10) Patent No.: US 11,948,127 B2
(45) Date of Patent: *Apr. 2, 2024

(54) SYSTEMS AND METHODS FOR AUGMENTED REALITY INVENTORY TRACKING

(71) Applicant: Fortress Cyber Security, LLC, Orlando, FL (US)

(72) Inventors: Roumen Kassabov, Orlando, FL (US); Peter Kassabov, Winter Park, FL (US)

(73) Assignee: Fortress Cyber Security, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,168

(22) Filed: Jul. 19, 2022

(65) Prior Publication Data
US 2022/0351512 A1    Nov. 3, 2022

Related U.S. Application Data

(63) Continuation of application No. 16/595,276, filed on Oct. 7, 2019, now Pat. No. 11,393,195.

(51) Int. Cl.
| | | |
|---|---|---|
| *G09G 5/00* | (2006.01) | |
| *G06Q 10/087* | (2023.01) | |
| *G06T 7/50* | (2017.01) | |
| *G06T 19/00* | (2011.01) | |
| *G06V 10/44* | (2022.01) | |
| *G06V 20/20* | (2022.01) | |
| *G06V 20/52* | (2022.01) | |
| *G06V 30/10* | (2022.01) | |

(52) U.S. Cl.
CPC .............. *G06Q 10/087* (2013.01); *G06T 7/50* (2017.01); *G06T 19/006* (2013.01); *G06V 10/44* (2022.01); *G06V 20/20* (2022.01); *G06V 20/52* (2022.01); *G06V 30/10* (2022.01)

(58) Field of Classification Search
CPC ....... G06T 19/006; G06T 19/00; G06F 3/011; G06F 3/012; G02B 27/017
USPC ........................................................ 345/633
See application file for complete search history.

(56) References Cited

U.S. PATENT DOCUMENTS

| | | | |
|---|---|---|---|
| 2002/0152438 A1 | 10/2002 | Terry | |
| 2015/0046989 A1* | 2/2015 | Oberheide | H04L 63/0876 726/6 |
| 2015/0310601 A1* | 10/2015 | Rodriguez | G06Q 20/208 348/150 |
| 2018/0189567 A1* | 7/2018 | Maheriya | G09B 21/007 |
| 2018/0218218 A1* | 8/2018 | Madan | G06F 3/0346 |
| 2020/0210665 A1* | 7/2020 | Svetal | G06K 7/1473 |

* cited by examiner

*Primary Examiner* — Gordon G Liu
(74) *Attorney, Agent, or Firm* — Volpe Koenig P.C.

(57) ABSTRACT

The present disclosure describes systems and methods for augmented reality inventory tracking and analysis that identifies devices based on a combination of features, retrieves a configuration or other characteristics of the selected device and presents the configuration as a rendered overlay on a live image from the camera.

15 Claims, 5 Drawing Sheets

SYSTEMS AND METHODS FOR AUGMENTED REALITY INVENTORY TRACKING

RELATED APPLICATIONS

The present application claims the benefit of and priority as a continuation to U.S. Nonprovisional application Ser. No. 16/595,276, entitled "Systems and Methods for Augmented Reality Inventory Tracking," filed Oct. 7, 2019, and issued as U.S. Pat. No. 11,393,185 on Jul. 19, 2022, the entirety of which is incorporated by reference herein.

BACKGROUND

Inventory tracking and analysis is used both in warehousing and distribution of products, but also within management of installations, such as deployments of network and computing devices within an office or plant. Managing these inventories manually can be time consuming and difficult, with hundreds, thousands, or tens of thousands of devices or more, each with individual configurations and settings to keep track of. As a result, mistakes in data entry or failure to properly read records may result in lost or misplaced devices, incorrect configurations and settings, and confusion requiring even more time to correct.

Previous attempts to track inventories have involved tracking devices such as radiofrequency identification (RFID) tags, barcodes or other optically scannable codes, or other such technologies. However, these systems suffer from high expense and cumbersome implementations (e.g. due to the need to affix tags to each device), and do not work accurately if the tag was obscured, detached, marked, or otherwise improperly affixed. Other attempts using cameras to track and identify objects resulted in false positive and false negative matches, in which images of devices from various angles may be mistaken for images of other devices, particularly if part of the device was obscured or if multiple similar items were present.

Additionally, these tracking systems fail to address the second problem of inventory management once devices are recognized. Users or administrators must still return to printed sheets of information to identify configurations or manually access large databases, and misreading of a paper or a typographical error in a query may result in retrieving incorrect information. The manual processes involved at each step thus add expense, time, and are prone to errors.

SUMMARY

The present disclosure describes an augmented reality system that identifies devices based on a combination of features, such as images of one or more sides of the device, depth or contour maps of the shape of the device generated from the images (e.g. via a stereoscopic camera, via a time-of-flight camera, etc.), extracted or recognized characters within the image (e.g. via optical character recognition), geographical location (e.g. based on a location of the imaging device, and/or the identified device), etc. The system identifies candidate devices identified from each set of features and selects a device responsive to a correlation between different candidate device sets. The system retrieves a configuration or other characteristics of the selected device and presents the configuration as a rendered overlay on a live image from the camera. This allows an operator or user of the system to effectively point a scanner at a device and automatically retrieve device-specific settings and configuration details, eliminating manual steps and reducing errors from data entry or interpretation.

BRIEF DESCRIPTION OF THE FIGURES

In the drawings, like reference numbers generally indicate identical, functionally similar, and/or structurally similar elements.

DETAILED DESCRIPTION

Figure 1A:
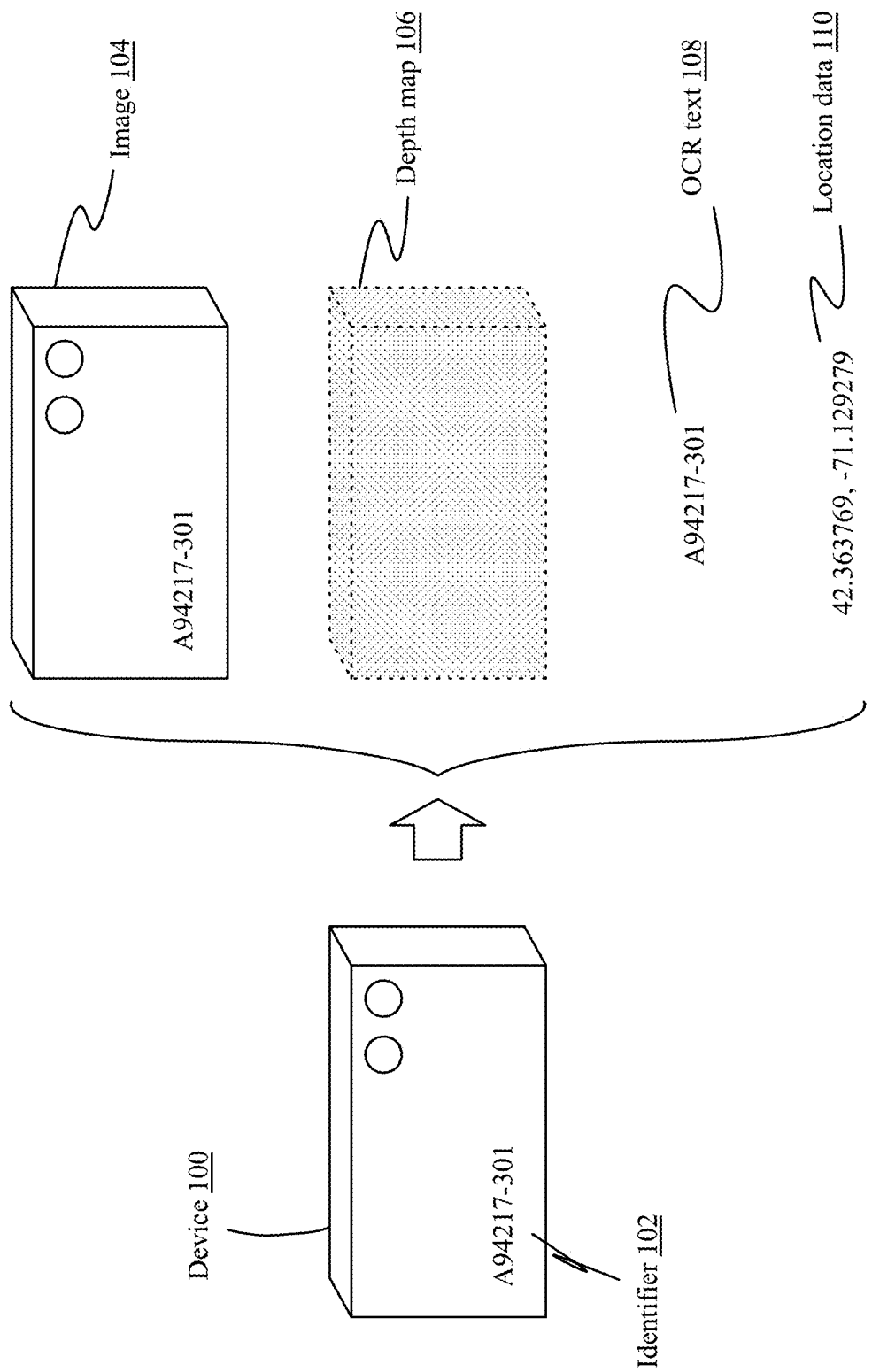
FIG. 1A is an illustration of extraction of information from an image of a device, according to some implementations.

The following description in conjunction with the above-referenced drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Inventory tracking and analysis is used both in warehousing and distribution of products, but also within management of installations, such as deployments of network and computing devices within an office or plant. Managing these inventories manually can be time consuming and difficult, with hundreds, thousands, or tens of thousands of devices or more, each with individual configurations and settings to keep track of. For example, a typical information technology installation for a large enterprise may include tens of thousands of computing devices (e.g. desktop computers, laptop computers, server computers, mobile devices, etc.) and network devices (e.g. switches, firewalls, routers, access points, network accelerators, network storage devices, etc.). Managing these devices may require maintenance of a spreadsheet or database with a corresponding tens of thousands of discrete entries, each of which may have dozens or hundreds of characteristics (e.g. serial numbers, operating system versions, firmware versions, internet protocol addresses, virtual addresses, domains, user names and passwords, software installations and versions, etc.). A typographical error entering, for example, a serial number for a device may subsequently result in hours wasted trying to identify a nonexistent device, and/or attempting to determine why an existent device is not included in the inventory. Accordingly, mistakes in data entry or failure to properly read records may result in lost or misplaced devices, incorrect configurations and settings, and confusion requiring even more time to correct.

Previous attempts to track inventories have involved tracking devices such as radiofrequency identification (RFID) tags, barcodes or other optically scannable codes, or other such technologies. For example, IT staff may attach a unique barcode to each device and use a handheld scanner to scan the barcode when attempting to identify a device. While this avoids errors in reading serial numbers, it does not address other data entry issues. Furthermore, these systems have suffered from high expense and cumbersome implementations (e.g. due to the need to affix tags to each device), and do not work accurately if the tag was obscured, detached, marked, or otherwise improperly affixed.

Other attempts using cameras to track and identify objects may result in false positive and false negative matches, in which images of devices from various angles may be mistaken for images of other devices, particularly if part of the device was obscured or if multiple similar items were present. Furthermore, if the device is moved, because the imaging system may also compare background items in the captured image to reference images, the device may need to be reimaged or otherwise tracked through manual logging.

Additionally, these tracking systems fail to address the second problem of inventory management once devices are recognized. Users or administrators must still return to printed sheets of information to identify configurations or manually access large databases such as the aforementioned spreadsheets, and misreading of a paper or a typographical error in a query (e.g. searching for an incorrect serial number of a device) may result in retrieving incorrect information. The manual processes involved at each step thus add expense, time, and are prone to errors.

The present disclosure describes an augmented reality system that identifies devices based on a combination of features, such as images of one or more sides of the device, depth or contour maps of the shape of the device generated from the images (e.g. via a stereoscopic camera, via a time-of-flight camera, etc.), extracted or recognized characters within the image (e.g. via optical character recognition), geographical location (e.g. based on a location of the imaging device, and/or the identified device), etc. The system identifies candidate devices identified from each set of features and selects a device responsive to a correlation between different candidate device sets. The system retrieves a configuration or other characteristics of the selected device and presents the configuration as a rendered overlay on a live image from the camera. This allows an operator or user of the system to effectively point a scanner at a device and automatically retrieve device-specific settings and configuration details, eliminating manual steps and reducing errors from data entry or interpretation.

Referring briefly to FIG. 1A, illustrated is an example of extraction of information from an image of a device 100, according to some implementations. The device 100 may have a visual appearance or image 104, which may be captured by one or more cameras. The image 104 may be black and white or color, in various resolutions, and at any suitable resolution and size. In some implementations, multiple cameras may be used to capture images of multiple angles of a device simultaneously.

The device may also have a shape or contour, which may be captured as a depth map or point cloud 106 or bitmap in which each pixel has a depth (z-axis) value representing a distance from the camera. The camera used to generate the depth map 106 may be a stereoscopic camera (e.g. two cameras separated by a predetermined or fixed distance, allowing for stereoscopic imaging and determination of depth based on parallax calculations), a time-of-flight or scanning camera (e.g. a radar system, LIDAR system, ultrasonic system, or similar transmitter and sensor that measures a time of flight of a transmitted signal that bounces off the device and returns to the sensor, in some implementations swept or scanned across the field of view (scanning) or in other implementations provided via a pulse (time-of-flight or scannerless) to illuminate the scene), or any other type of depth-sensing device.

In some implementations, the device may include surface identifiers 102, which may be alphanumeric text, logos, or any other such identifiers. In some implementations, identifiers 102 may include a brand name, a model name or identifier, a serial number, or any other such information. Identifiers 102 may be extracted from an image 104 via an optical character recognition (OCR) system and stored as text 108, in some implementations.

In some implementations, location information 110 of a device 100 may be recorded, e.g. based on a location of a second device or capture device used to image the device 100 (e.g. a smartphone, a portable camera, or any other such device). In some implementations, location data 110 may be dynamically generated, such as based on geolocation functionality, such as a GPS receiver, WiFi or cellular triangulation or location system, or similar functionality (e.g. of the device 100, or of the second device or capture device); while in other implementations, location data 110 may be explicitly encoded (e.g. based on a predetermined location of the capture device, such as "office" or "warehouse") or manually entered by a user or administrator.

All of this information 104-110 may be used to uniquely identify a device 100, and may improve accuracy of identification compared to systems that use a single item of information (e.g. image-based tracking, or serial number-based tracking) by identifying correlations between candidate devices identified by each item of information. For example, ideally, only a single device 100 in a reference library matches a captured image 104, depth map 106, text 108, and location data 110, in which case, identification may be relatively straightforward. However, if multiple devices 100 potentially match the captured information (e.g. in the case in which location data 110 identifies a location in which many devices are present, such as an "office"; if OCR text 108 only identifies a model type rather than a specific device; or if multiple devices have similar exteriors such that images 104 and depth maps 106 are identical between the devices), then by identifying candidate devices matching each item of information, a subset of devices that are present in each candidate set or a correlation or Boolean intersection between the sets may be used to identify the actual device. Errors in one item of captured information (such as corrupted text or an occluded image) may thus be "out-voted" by other information that does result in correlated candidate devices, improving accuracy of identification.

Figure 1B:
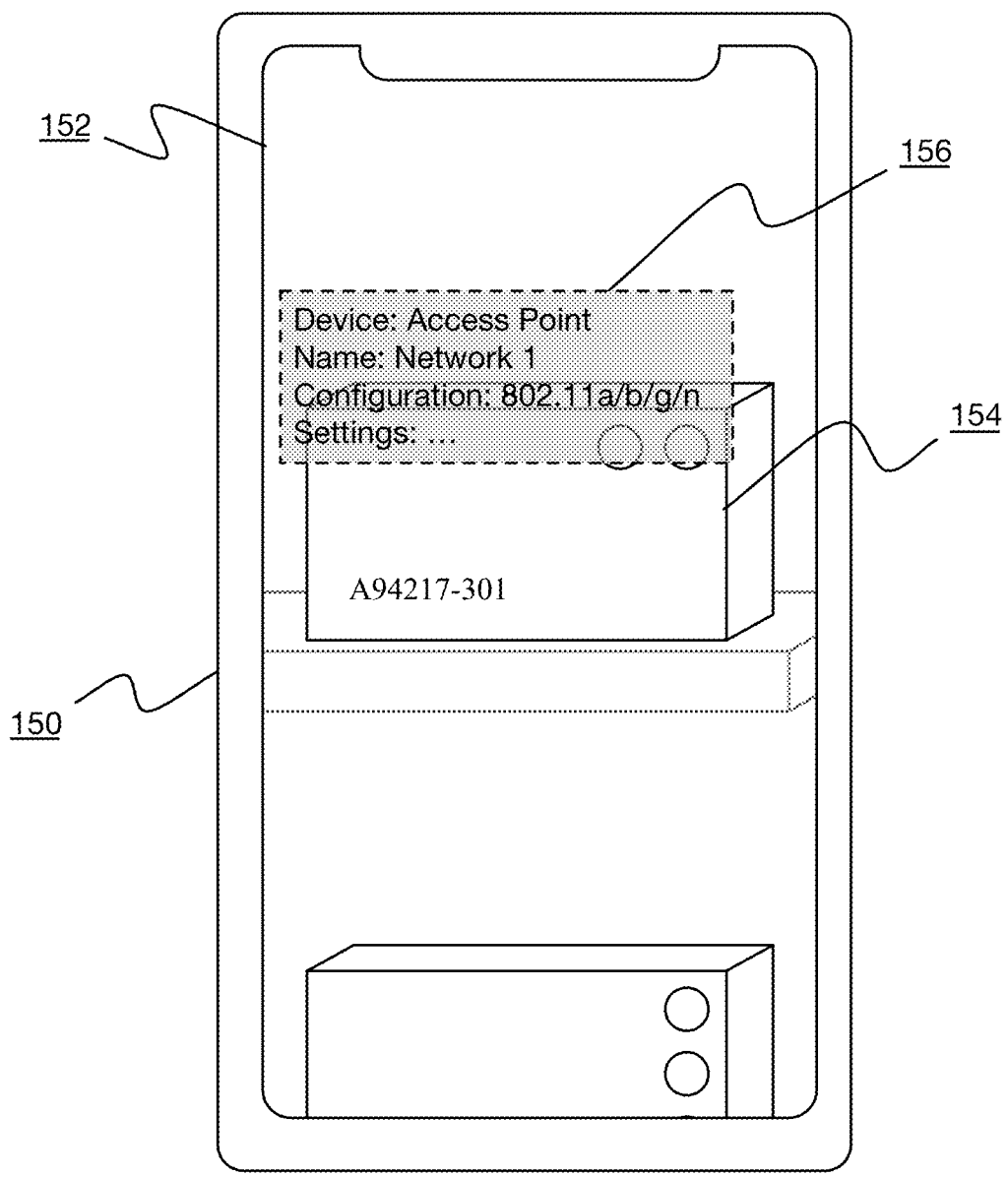
FIG. 1B is an illustration of augmented reality inventory tracking, according to some implementations.

Additionally, to address the second problem of utilizing information about a device once the device is identified, an augmented reality system may be used to retrieve and present information about the device, such as configurations, settings, or other information, in real time as an overlay over a live image of the device on a display captured via a camera. FIG. 1B is an illustration of augmented reality inventory tracking, according to some implementations. A user or administrator may use a portable device 150, such as a smart phone, to capture an image of a device 154 (as well as location information of the portable device 150, in some implementations, as discussed above). A depth map and/or OCR text may be extracted based on the image or may be extracted from a second image captured by a second sensor (e.g. time-of-flight camera or other sensor). The captured information may be compared to reference information for the device 154, either locally on device 150 or at a remote server device (not illustrated). Once the device 154 is identified, a configuration or information about the device may be retrieved. The configuration or information may be formatted in any appropriate data format, such as XML data or JavaScript Object Notation (JSON) data, or any other type and form of data. The retrieved configuration may be displayed as an overlay 156 on a live image of the device 154 on a display 152 of the device 150. The retrieved configuration may be a configuration stored in a database, such as one retrieved from the device and/or set by an administrator, or, in some implementations, may be dynamically retrieved from the device itself (e.g. in the case of a connected or networked device, such as via a remote management protocol or application programming interface (API) of the device). In some implementations, a configuration or other information may be retrieved both from the device dynamically as well as from a database; the two sets of information may be compared to determine whether the device matches the known or predetermined configuration in the database. The results of the comparison may be displayed via the overlay 156 to allow a user to instantly identify whether the device is operating properly or not or has been modified from a predetermined configuration. In some implementations, additional analysis may be performed based on the retrieved state or configuration of the device for display via the overlay 156, such as analysis of data throughput (e.g. latency, error rates, etc.), security states (e.g. whether firmware or patches have been applied, or whether a firewall is enabled or disabled), as well as any other information retrievable via an API of the device or remote procedure call to the device.

In some implementations, the specific device may be identified based on the capture information (e.g. where a single candidate device is identified from the combined captured information), while in other implementations, a device type may be identified based on the capture information (e.g. a model of a device, where multiple devices of that model are present in the system and at the same location, such that they cannot be distinguished without additional information, such as a serial number that is not visible).

Figure 2A:
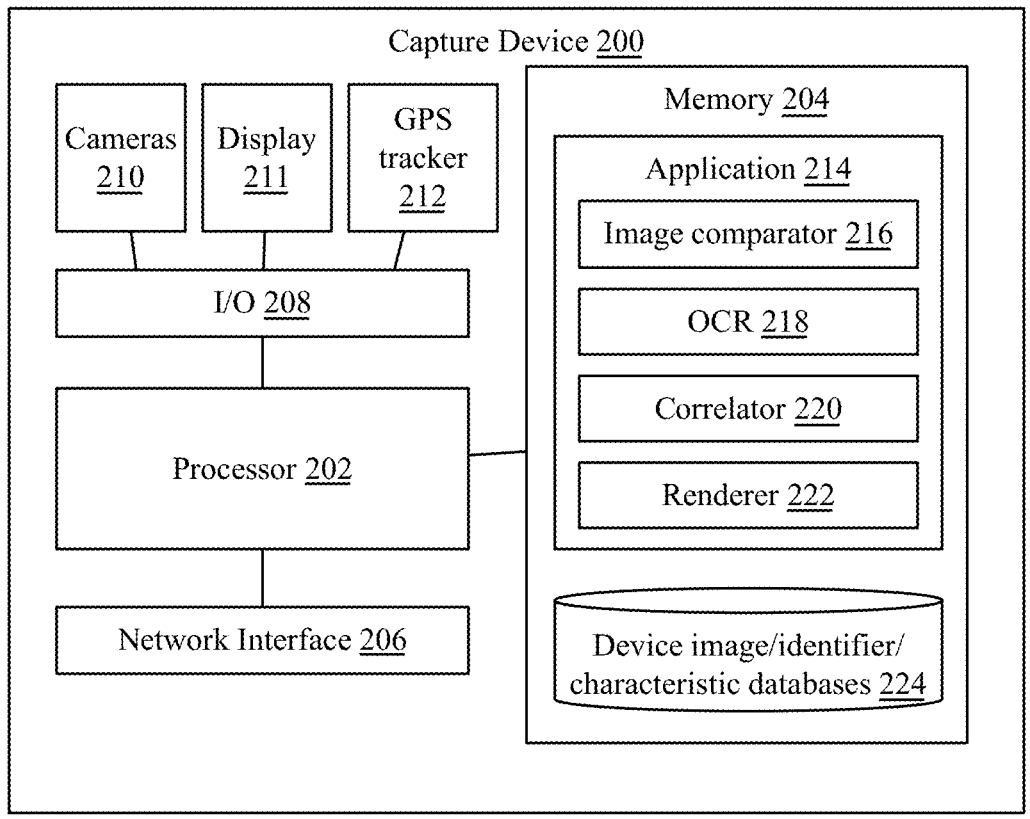
FIGS. 2A-2B are block diagrams of embodiments of servers and computing devices.
Figure 2B:
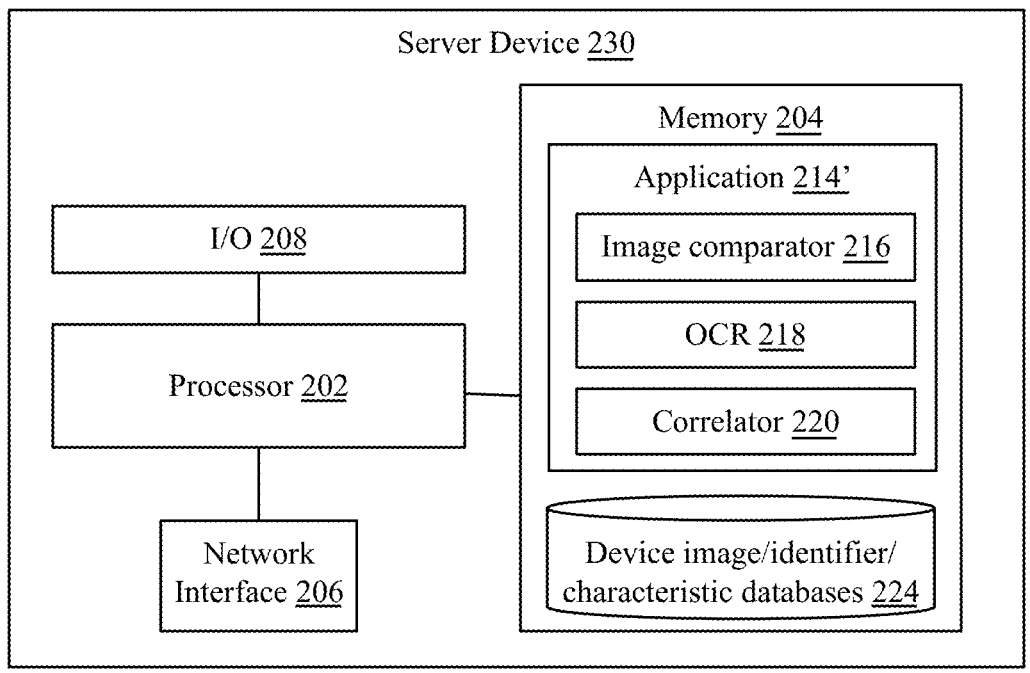

FIGS. 2A-2B are block diagrams of embodiments of servers and computing devices, such as a capture device 200 and a server device 230. Referring first to FIG. 2A, illustrated is an implementation of a capture device 200. As discussed above, a capture device 200 may comprise a laptop computer, desktop computer, wearable computer, portable computer, smart phone, tablet computer, appliance, or any other type and form of device, and may be used by a user or administrator to capture images and other information about a device to be identified and/or configured. In some implementations, a capture device 200 may not include all of elements 202-224 illustrated, or may include a plurality of any of elements 202-224 or other elements. For example, in one implementation, a capture device 200 may comprise a plurality of network interfaces 206. Furthermore, although illustrated as a single device, in many implementations, a capture device 200 may comprise a plurality of devices in communication via a network, such as a networked camera 210 and a desktop computer with a processor 202.

A capture device 200 may include one or more processors 202. A processor 202 may comprise a central processing unit (CPU), microprocessor, application-specific instruction-set (ASIC) processor, or any other type and form of processor for processing images and/or data, rendering overlay data via a display 211, and/or for communicating via a network interface 206 with a device 100 and/or a server device 230. A processor 202 may communicate with one or more network interfaces 206, which may comprise any type and form of network interfaces, such as a physical interface (e.g. Ethernet, fiber optic interface, or any other such interface), a wireless interface (e.g. 802.11a, 802.11b, 802.11.g, 802.11n, 802.11ac, Bluetooth, cellular, or any other such interface), or a virtual or abstract interface (e.g. physical transport of storage, or "SneakerNet"), or any other such type and form of interface. Network interfaces 206 may communicate with devices 100 and/or servers 230 via a network (not illustrated), which may comprise any type and form of network or networks, including a local area network (LAN) and/or wide area network (WAN) such as the Internet. For example, in many implementations, a capture device 200 may connect to a first LAN, which may connect to the Internet, which may further connect to a second LAN connected to a server device 230. Accordingly, a network may comprise one or more of a physical network, an Ethernet network, a satellite network, a wireless network, a cellular network, or any other network or combination of networks, and may further comprise one or more devices including gateways, firewalls, network accelerators, proxies, switches, hubs, routers, WiFi access points, load balancers, or any other such devices.

A network interface may include a network stack, which may comprise processing and functionality for a plurality of layers of the stack, including a physical layer, network layer, transport layer, session layer, presentation layer, application layer, or any other such layers. The network stack may comprise routines for encapsulating and de-encapsulating headers and payloads of packets at various layers, and may provide functionality for one or more protocols at any layer of the network stack.

A capture device 200 may execute a packet processing engine, which may be part of the network interface 206 or network stack, or may be executed separately by a processor 202. A packet processing engine may comprise an application, service, server, daemon, routine, or other executable logic for processing packets, including performing network address translation, encryption, decryption, compression, decompression, modification of headers or payloads, buffering, caching, pooling, multiplexing, fragmentation or defragmentation, error correction, retransmission handling such as for a lossless protocol, or any other type and form of processing. In some implementations, a packet processing engine may extract data or identifiers from a packet for analysis and filtering, such as extracting IP addresses or ports, protocol types, QoS parameters, payload sizes, sequence numbers, or any other type and form of information.

A capture device 200 may comprise one or more input/output interfaces 208. An input or output interface 208 may comprise or communicate with any type and form of interface and/or connected peripherals, such as one or more cameras 210, displays 211, and/or location sensors such as GPS trackers 212; a parallel or serial interface, such as a universal serial bus (USB) interface and a mouse or keyboard, or an external serial AT attachment (eSATA) interface and one or more external storage devices; or any other type and form of interface.

Camera 210 may comprise any type and form of image or signal capturing sensor, including optical sensors, infrared sensors, ultrasonic sensors, radar or LIDAR sensor, or any other such sensor. Camera 210 may be a single camera or an array of a plurality of cameras 210 (e.g. two cameras, three cameras, or any other number). Cameras 210 may capture two-dimensional images, and/or may capture three-dimensional images, point clouds, depth maps, contour maps, or similar data. Cameras 210 may comprise scanning or scannerless LIDAR, time-of-flight or pulsed cameras, stereoscopic cameras, or other such cameras capable of detecting depth. Cameras 210 may output bitmaps or images in any type and format, such as black and white data, color data, three dimensional data (e.g. with a z-axis value for each pixel), or any other such format. Camera 210 may capture static images and/or may capture video (e.g. for display of augmented reality data as an overlay to a captured or live video in real-time).

Display 211 may comprise any type and form of display, such as an LCD or LED display, and may incorporate an input device, such as a capacitive or resistive touchscreen. Display 211 may be used for display of live video from camera 210 for tracking and identification of devices and for display of configuration data or other information of identified devices via an overlay.

Location trackers or GPS trackers 212 may comprise one or more signal receivers for receiving location-indicating information, such as GPS signals, WiFi signals, cellular signals, or other such signals, and for determining a location based on triangulation, received signal strength, or a combination of these or other information. In some implementations, location trackers 212 may include accelerometers or gyroscopes for sensing orientation of capture device 200. For example, a capture device may determine a location via GPS or cellular signals, and may determine a pointing angle of a camera 210 of the device based on an orientation of the device, determined via one or more accelerometers, such that a view of a captured image may be determined (and, combined with depth information of the image, a position of an identified device determined).

A capture device 200 may comprise one or more memory devices 204. Memory 204 may comprise any type and form of memory or storage, including random access memory (RAM), hard drive storage, solid state drive storage, flash memory, optical or magneto-optical storage, tape storage, or any other type and form of storage device.

In some implementations, a capture device 200 may execute an application 214. Application 214 may comprise an applet, server, daemon, service, routine, or other executable logic for capturing images or other sensor data and for displaying device configurations and information as an augmented reality overlay. In some implementations, application 214 may also process the captured image or other sensor data, e.g. to generate depth maps and/or extract OCR text from an image or sensor data. In some implementations, application 214 may also identify candidate devices or device types from one or more databases based on the captured information, and may select a device or device type from the candidates corresponding to the device to be identified based on a correlation or intersection between candidate device sets.

In other implementations, one or more functions of application 214 may be provided by a server device 230 via a network. For example, referring briefly to FIG. 2B, a server device 230 may comprise one or more of input/output interfaces 200, processors 202, memory devices 204, and/or network interfaces 206. A server device 230 may execute an application 214, as discussed above, or parts of an application 214, such as an image comparator 216, OCR analyzer or parser 218, and correlator 220, and may retrieve device information or types and candidates from one or more databases 224.

Returning to FIG. 2A, in some implementations, application 214 may include an image comparator 216. Image comparator 216 may comprise hardware and/or software for comparing a capture image or images to one or more images in a reference library or data set. In some implementations, image comparator 216 may perform preprocessing of an image, such as cropping, resizing, reducing color depth or resolution, rotating the image, and/or otherwise processing the image. In some implementations, image comparator 216 may perform feature analysis to classify an image, and may comprise a machine learning system, such as a neural network trained on a plurality of images in a reference data set. In some such implementations, image comparator 216 may be provided by a hardware processor or co-processor, such as a tensor processing unit. In other implementations, image comparator 216 may perform edge detection and/or similar techniques to identify matches between reference images and a captured image. Image comparator 216 may identify a candidate set of reference images that match a captured image, in some implementations. Each candidate may have an associated score or confidence ranking generated responsive to a correlation between the corresponding reference image and the captured image. Each candidate may be associated with a device or device type, and accordingly, application 214 may identify a first set of candidate devices or devices types, and associated scores or rankings for each candidate. The first set may include a single device or type (which may or may not have a 100% score or ranking associated with it, depending on how closely the reference image matches), or may include a plurality of devices or device types in some implementations or instances, depending on how many reference images the captured image matches or partially matches.

Similarly, in some implementations, image comparator 216 may also generate a depth map or contour map from a captured image or images (e.g. stereoscopic images) or from depth sensor data (e.g. time-of-flight data, etc.). The depth map may comprise z-axis values for pixels of an image, a volumetric point cloud or similar data structure, or any other type and form of data structure identifying contours or three-dimensional boundaries of a device. In some implementations, the contours or boundaries may be incomplete, due to occlusion of some surfaces from the camera (e.g. the depth map or contour map may not accurately depict the rear of a device, when generated from a camera or cameras in front of the device). Image comparator 216 may compare the generated depth map or contour map to reference depth maps in a database 224, similar to the image comparison discussed above. As discussed above, image comparator 216 may use any suitable technique, including feature analysis, edge detection, machine learning systems such as neural networks, or any other such system. Image comparator 216 may identify a second candidate set of reference depth maps that match a generated depth map, in some implementations. Each candidate may have an associated score or confidence ranking generated responsive to a correlation between the corresponding reference image and the captured image. Each candidate may be associated with a device or device type, and accordingly, application 214 may identify a second set of candidate devices or devices types, and associated scores or rankings for each candidate. The second set may include a single device or type (which may or may not have a 100% score or ranking associated with it, depending on how closely the reference image matches), or may include a plurality of devices or device types in some implementations or instances, depending on how many reference images the captured image matches or partially matches. The first set of candidate devices and second set of candidate devices may include one or more devices in common, and may also include one or more devices unique to each candidate data set that may be excluded from consideration as identifying the target device.

Application 214 may include an optical character recognition (OCR) analyzer or parser 218. OCR analyzer 218 may identify alphanumeric characters in a capture image and generate data strings corresponding to the identified characters. OCR analyzer 218 may, in some implementations, apply a regular expression to filter the generated data strings to identify patterns of characters matching predetermined patterns, such as serial numbers, model numbers, IP addresses, or other such data. In some implementations, OCR analyzer 218 may compare generated or identified data strings to reference data strings in a database 224, and may generate a second set of one or more matching candidate data strings and corresponding scores or confidence rankings, as discussed above, each data string corresponding to a device or device type. The third set of candidate devices or device types may or may not be identical to the first or second sets of candidate devices or device types generated by image comparator 216, and/or scores or rankings between the sets may be different. For example, in many implementations, OCR analyzer 218 may extract a partial serial number or model number, with one or more characters unreadable. The extracted partial serial number or model number may potentially match several candidate devices, and OCR analyzer 218 may generate a set of candidate devices and corresponding scores, based on how well the extracted partial serial number or model number matches the candidate devices. The third set of candidate devices and first and/or second set of candidate devices may include one or more devices in common, and may also include one or more devices unique to each candidate data set that may be excluded from consideration as identifying the target device. In some implementations, OCR analyzer 218 may also extract and identify other features in a captured image, such as logos, symbols, or other such entities.

Application 214 may include a correlator 220 for identifying a correlation between sets of candidate devices or device types. Correlator 220 may, in some implementations, determine an intersection (e.g. Boolean And) between sets of candidate devices or device types to identify devices or device types that are common to the multiple sets of candidate devices or devices types. In other implementations, correlator 220 may compute an aggregated score for each device or device type listed in the candidate sets. For example, in one such implementation, correlator 220 may compute an average of scores for a particular device or device type identified in each set. In other implementations, the aggregated score may be determined via any suitable algorithm (e.g. a weighted average, or non-linear combination of scores). In some implementations, scores may be normalized before aggregation (e.g. increasing scores in a candidate set such that a highest score is equal to a predetermined value). Correlator 220 may select a device or device type to associate with the target or captured device, responsive to the selected device or device type having a highest aggregated score in some implementations, or being common to each candidate set in some implementations.

As discussed above, in some implementations, location data of the capture device and/or target device may be captured. In such implementations, correlator 220 may filter candidate sets based on associated locations and the location data. For example, correlator 220 may remove candidates from sets based on the candidates having associated locations that do not match the captured location (e.g. candidate devices identified as being at a data center may be filtered from the candidate sets, responsive to the capture device being at an office). This may be done prior to or after aggregation of scores, in various implementations.

Application 214 may retrieve data or characteristics associated with the selected device or device type. The data or characteristics may be stored in a database 224 in some implementations, and/or may be retrieved from the target or captured device dynamically. For example, after uniquely identifying a device, in some implementations, application 214 may determine a network address of the device (e.g. from a database 224), and may request a configuration, state, log file, or other such data from the device via a remote procedure call or API. In some implementations, log files or other parameters or configurations may be periodically retrieved from all devices in the system (e.g. hourly, nightly, or at any other such interval), and stored in a database 224. This may reduce latency in providing the data for rendering in an overlay, in some implementations. In some implementations, application 214 may perform one or more analysis functions on the retrieved information or configuration, such as comparing a dynamically retrieved configuration of a device to a predetermined or default configuration for the device to identify any differences, compare a current state to an expected state, or any other such analyses.

In some implementations, images, depth maps, data strings, and other information in a database 224 may be generated locally, e.g. when initially inventorying or identifying devices or otherwise adding the devices to database 224. In other implementations, the information in database 224 may be provided by a manufacturer (e.g. device manufacturer, and/or manufacturer of capture device 200). For example, database 224 may be pre-loaded by a manufacturer with images, depth maps, and other data for a variety of devices, and/or information about devices may be provided by a manufacturer of such devices. In some implementations, databases 224 may be shared between locations, such that a new device or asset may be scanned and recognized in one location or installation and added to the database; and subsequently at another location, a similar new device or asset may be scanned and immediately recognized without the need to add additional data. Accordingly, data in databases 224 may be provided locally or remotely, by the user, an administrator, or manufacturer of the capture device or any other device or asset.

Application 214 may include a rendering engine 222. Rendering engine 222 may composite or combine an image or live video captured by a camera 210 of capture device 200 with an overlay comprising the retrieved information or configuration about a device or device type. The overlay may be opaque or transparent in various implementations, and may be positioned within the display at a location corresponding to the device or at a predetermined location (e.g. the center of the display, in a corner of the display, etc.).

Figure 3:
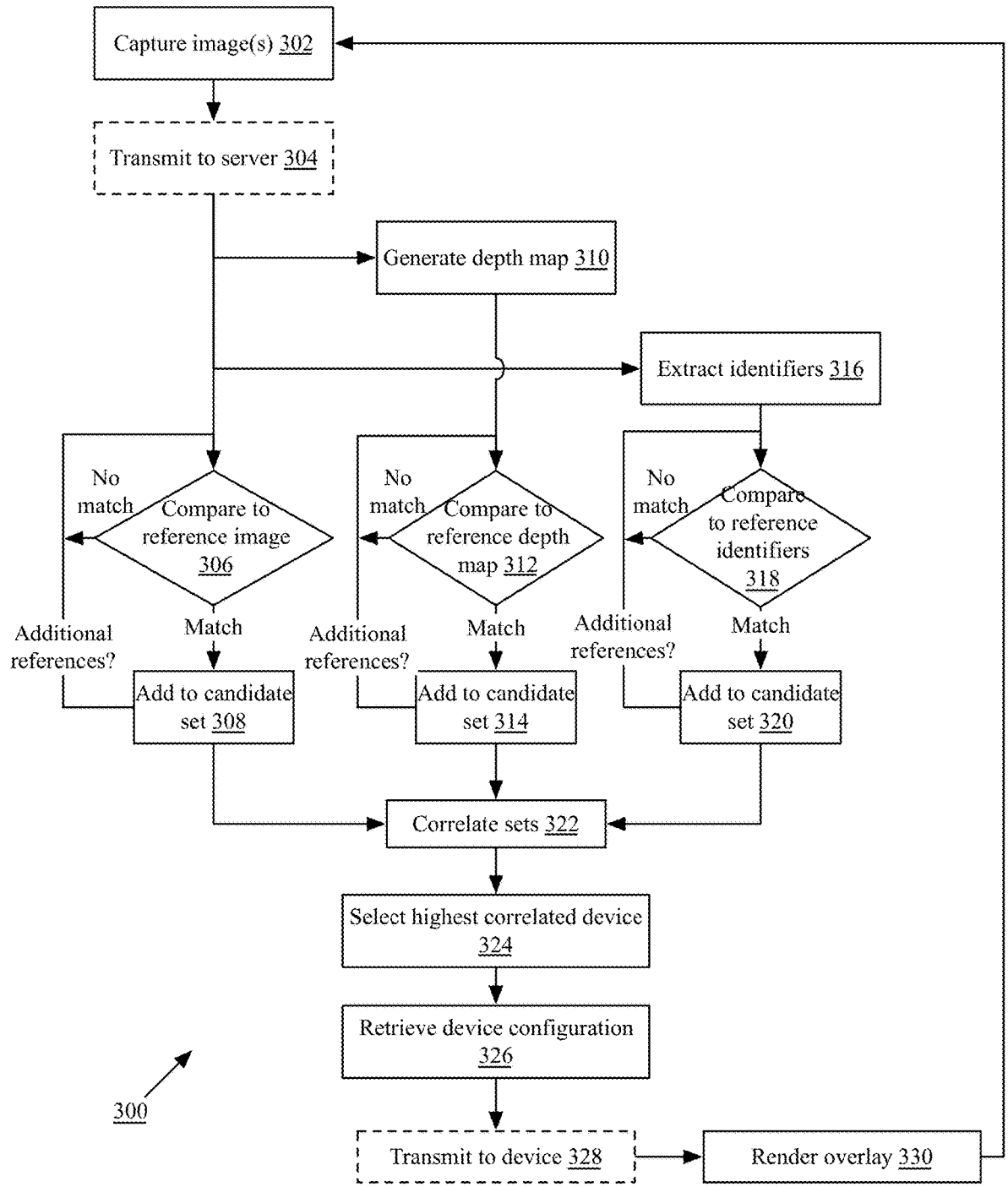
FIG. 3 is a flow chart of an embodiment of a method for augmented reality inventory tracking.

FIG. 3 is a flow chart of an embodiment of a method 300 for augmented reality inventory tracking. At step 302, a capture device may capture one or more images of a target device, and/or additional sensor data of the device, such as location data, depth map data, etc. The image may be captured via one or more cameras or other sensors of the capture device, as discussed above.

At step 304, in some implementations, the captured image or images and/or sensor data may be provided to a server for comparison to reference data. The images may be provided along with a request for an identification of a device or device type and configuration, which may be done via an API, remote procedure call, web socket request, or other such request. In other implementations, comparisons may be done on the capture device, as discussed above.

At step 306, the capture device or server may compare the captured image or images to reference images. The capture device or server may perform any necessary preprocessing on the images, including cropping, scaling, rotation, edge detections, or other transformations. If the image matches a reference image, a device or device type associated with the reference image may be added to a candidate set at step 308. In some implementations, a score may be added to the set for the device or device type, responsive to how closely correlated the image and reference image are. Steps 306-308 may be repeated iteratively for each reference image.

In parallel or serially, at step 310, the capture device or server may generate or extract a depth map from the captured image or images or sensor data, as discussed above. At step 312, the capture device or server may compare the generated depth map to reference depth maps, performing any preprocessing necessary as discussed above. If the depth map matches a reference depth map, at step 314, a device or device type associated with the reference depth map may be added to a second candidate set at step 314. In some implementations, a score may be added to the set for the device or device type, responsive to how closely correlated the depth map and reference depth map are. Steps 312-314 may be repeated iteratively for each reference depth map.

Similarly in parallel or serially, at step 316, the capture device or server may extract identifiers such as alphanumeric characters, logos, or other identifiers from the captured image or images, such as via an OCR function. The extracted identifiers may be parsed or filtered to extract strings matching predetermined patterns of serial numbers, model numbers, manufacturer names, or any other such patterns. At step 318, the extracted and filtered identifiers may be compared to reference identifiers. If the extracted identifier matches the reference identifier, a device or device type associated with the reference identifier may be added to a third candidate set at step 320. In some implementations, a score may be added to the set for the device or device type, responsive to how closely correlated the extracted identifier and reference identifier are. Steps 318-320 may be repeated iteratively for each extracted identifier, as well as each reference identifier.

At step 322, the candidate sets may be correlated or intersected, and at step 324, a device or device type may be selected to be associated with the target device. As discussed above, in some implementations, a device or device type common to the candidate sets may be selected, or a device or device type having a highest aggregated score (e.g. based on a weighted average, unweighted average, or any other such aggregation).

At step 324, in some implementations, characteristics or configuration information about the selected device or device type may be retrieved, e.g. from a database of information associated with the device or device type, or directly from the device. In some such implementations, an address of the device may be retrieved from a database, and a request for configuration data or other information may be transmitted to the device, and the device may respond with the requested data. In some implementations, data retrieved from the device may be compared to data associated with the device in a database to identify any differences.

In some implementations, the retrieved and/or analyzed data may be transmitted to the capture device at step 328 (i.e. in implementations in which the capture device provided images or other information to a server device). In other implementations in which the comparison and data retrieval is performed by the capture device, step 328 (and step 304) may be skipped.

At step 330, the capture device may render the retrieved information or data as an overlay on a live image or real-time video captured by a camera of the device. The overlay may be placed within the display during rendering such that the information is visually associated with the target device, and may be removed when the capture device is rotated such that the target device is no longer shown within the display (or replaced with retrieved information about another device).

Although discussed primarily in terms of a single target device within a captured image, in some implementations, steps 306-330 may be repeated for a plurality of devices shown within the captured image, providing overlays of retrieved configuration information or other data for each device within the view of the camera.

Accordingly, the systems and methods discussed herein provide an augmented reality inventory tracking system that identifies devices based on a combination of features, retrieves a configuration or other characteristics of the selected device and presents the configuration as a rendered overlay on a live image from the camera. This allows an operator or user of the system to effectively point a scanner at a device and automatically retrieve device-specific settings and configuration details, eliminating manual steps and reducing errors from data entry or interpretation.

In some implementations, the augmented reality inventory tracking system may also be used for identifying cybersecurity vulnerabilities. For example, as discussed above, the system may allow an operator to point a scanner at a device and read, via a display of the scanner, information about a configuration of the device, including an identification of any differences between a live or current configuration of the device and a predetermined configuration, such as a configuration with recent security patches or configured to enable security features. This may allow the operator to easily identify vulnerabilities of the device. Furthermore, these systems and methods can be used for identifying rogue or vulnerable assets (e.g. identify misconfigured or malfunctioning devices based on current configurations or network behaviors, devices that don't correspond to a known inventory and may have been installed by a malicious third party, etc.).

In one aspect, the present disclosure is directed to a system for augmented reality inventory analysis. The system includes a computing device comprising a processor, a display, and an optical sensor. The optical sensor is configured to capture at least one image of a device. The processor is configured to: compare the captured at least one image of the device to a reference library of images of devices; identify at least one candidate device from the reference library of images of devices, based on the comparison; extract, from the at least one image, at least one alphanumeric identifier; select, from the at least one candidate device, a matching device having an alphanumeric identifier corresponding to the extracted at least one alphanumeric identifier; retrieve at least one characteristic of the matching device; and render, in real time via the display, an identification of the at least one characteristic as an overlay on a live image of the device captured via the optical sensor.

In some implementations, the computing device further comprises a network interface, and the processor is further configured to compare the captured at least one image of the device to the reference library of images of devices by: transmitting, via the network interface, the captured at least one image of the device to a second device comprising the reference library; and receiving, via the network interface, an identification of the at least one candidate devices and corresponding alphanumeric identifiers of the at least one candidate devices.

In some implementations, the processor is further configured to generate a depth map from the at least one captured image, and compare the generated depth map to a reference library of depth maps of devices. In a further implementation, the processor is further configured to identify the at least one candidate device based on each candidate device having an associated image that matches the captured at least one image of the device and an associated depth map that matches the generated depth map.

In some implementations, the at least one alphanumeric identifier comprises a serial or model number; and the processor is further configured to select a matching device having an alphanumeric identifier corresponding to the extracted serial or model number. In some implementations, the processor is further configured to select the matching device by excluding, from the at least one candidate device, at least one device having an alphanumeric identifier that does not correspond to the extracted at least one alphanumeric identifier.

In some implementations, the at least one characteristic of the matching device comprises a configuration of the matching device. In some implementations, the computing device further comprises a network interface, and the at least one characteristic of the matching device comprises a script, executable by the processor, to cause the computing device to retrieve, via the network interface from the device, a configuration of the device. In a further implementation, the processor is further configured to compare the retrieved configuration of the device to a predetermined configuration, and render in real time via the display, an identification of a difference between the retrieved configuration and the predetermined configuration as an overlay on the live image of the device captured via the optical sensor.

In another aspect, the present disclosure is directed to a system for augmented reality inventory analysis. The system includes a processor; a network interface in communication with a remote computing device; and a memory device storing a first database of images, each image associated with a device type, a second database of alphanumeric identifiers, each identifier associated with a device type, and a third database of device types, each device type associated with at least one characteristic. The processor is configured to: receive, via the network interface from the second computing device, an image of a target device; identify, via a comparison of the received image and the images of the first database, a first one or more candidate device types; extract, from the received image, at least a portion of an alphanumeric identifier; identify, via a comparison of the at least a portion of the alphanumeric identifier extracted from the received image and the alphanumeric identifiers of the second database, a second one or more candidate device types; determine, based on a correlation between the first one or more candidate device types and the second one or more candidate device types, a selected device type; retrieve, from the third database, the at least one characteristic associated with the selected device type; and provide, via the network interface to the second computing device, the retrieved at least one characteristic, the second computing device rendering an identification of the retrieved at least one characteristic as an overlay on a live image of the target device.

In some implementations, the processor is configured to identify the selected device type responsive to the selected device type being common to the first one or more candidate device types and the second one or more candidate device types.

In still another aspect, the present disclosure is directed to a method for augmented reality inventory analysis. The method includes capturing, by an optical sensor of a computing device, at least one image of a device. The method also includes comparing, by the computing device, the captured at least one image of the device to a reference library of images of devices. The method also includes identifying, by the computing device, at least one candidate device from the reference library of images of devices, based on the comparison. The method also includes extracting, by the computing device from the at least one image, at least one alphanumeric identifier. The method also includes selecting, by the computing device from the at least one candidate device, a matching device having an alphanumeric identifier corresponding to the extracted at least one alphanumeric identifier. The method also includes retrieving, by the computing device, at least one characteristic of the matching device. The method also includes rendering, by the computing device via a display, an identification of the at least one characteristic as an overlay on a live image of the device captured via the optical sensor.

In some implementations, the method includes transmitting, via a network interface of the computing device, the captured at least one image of the device to a second device comprising the reference library; and receiving, via the network interface, an identification of the at least one candidate devices and corresponding alphanumeric identifiers of the at least one candidate devices.

In some implementations, the method includes generating a depth map from the at least one captured image, and comparing the generated depth map to a reference library of depth maps of devices. In a further implementation, the method includes identifying the at least one candidate device based on each candidate device having an associated image that matches the captured at least one image of the device and an associated depth map that matches the generated depth map.

In some implementations, the at least one alphanumeric identifier comprises a serial or model number; and the method includes selecting a matching device having an alphanumeric identifier corresponding to the extracted serial or model number.

In some implementations, the method includes selecting the matching device by excluding, from the at least one candidate device, at least one device having an alphanumeric identifier that does not correspond to the extracted at least one alphanumeric identifier.

In some implementations, the at least one characteristic of the matching device comprises a configuration of the matching device. In some implementations, the method includes retrieving, via a network interface of the computing device from the device, a configuration of the device. In a further implementation, the method includes comparing the retrieved configuration of the device to a predetermined configuration, and rendering in real time via the display, an identification of a difference between the retrieved configuration and the predetermined configuration as an overlay on the live image of the device captured via the optical sensor.

Figure 4:
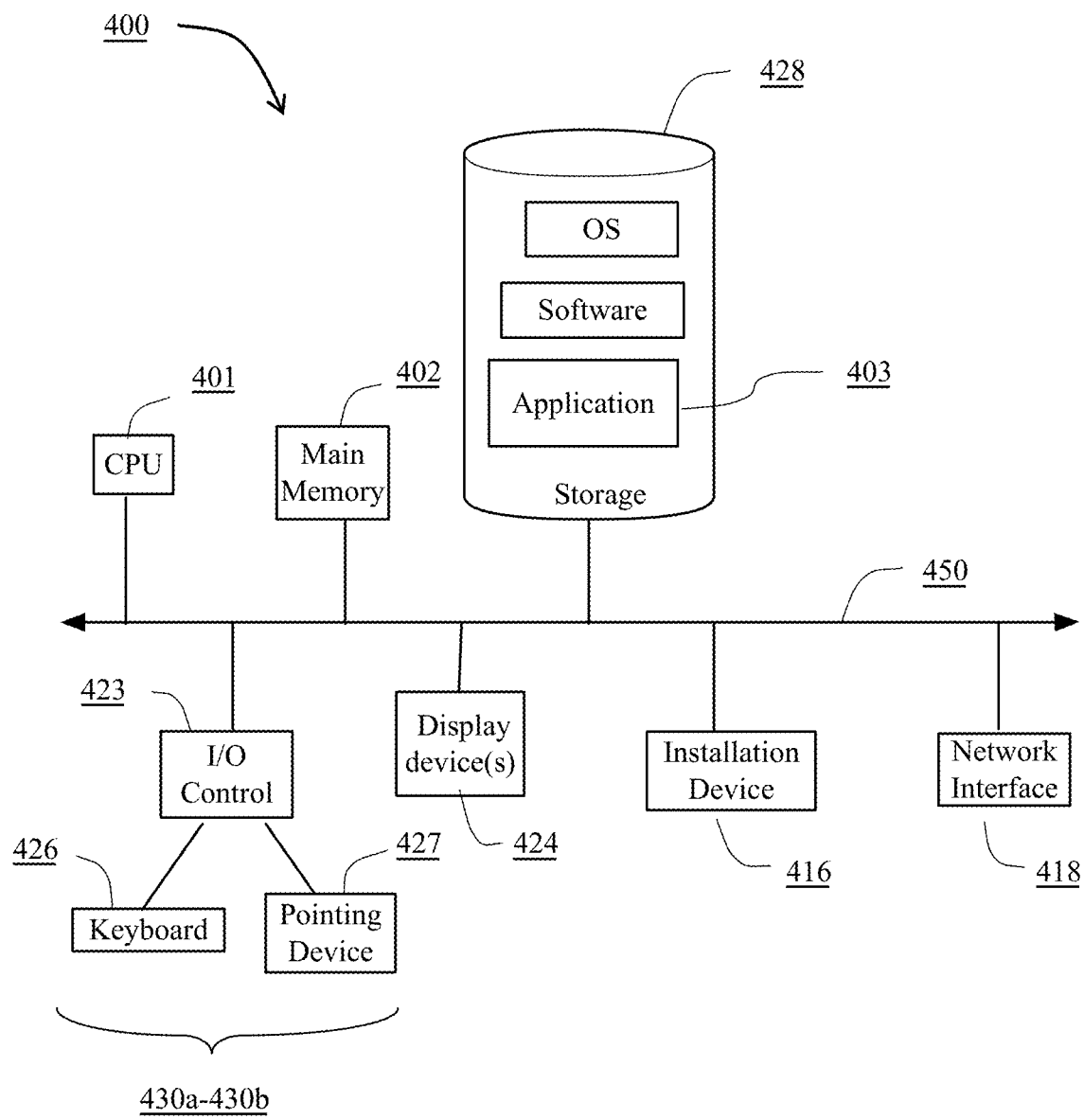
FIG. 4 is a block diagram of an exemplary computing device useful for practicing the methods and systems described herein.

FIG. 4 is a block diagram of an exemplary computing device useful for practicing the methods and systems described herein. The various devices 100, 150, 154, 200, and 230 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device.

FIG. 4 depicts a block diagram of a computing device 400 useful for practicing an embodiment of the security devices and/or client devices discussed above. A computing device 400 may include a central processing unit 401; a main memory unit 402; a visual display device 424; one or more input/output devices 430a-430b (generally referred to using reference numeral 430), such as a keyboard 426, which may be a virtual keyboard or a physical keyboard, and/or a pointing device 427, such as a mouse, touchpad, or capacitive or resistive single- or multi-touch input device; and a cache memory 440 in communication with the central processing unit 401.

The central processing unit 401 is any logic circuitry that responds to and processes instructions fetched from the main memory unit 402 and/or storage 428. The central processing unit may be provided by a microprocessor unit, such as: those manufactured by Intel Corporation of Santa Clara, California; those manufactured by Motorola Corporation of Schaumburg, Illinois; those manufactured by Apple Inc. of Cupertino California, or any other single- or multi-core processor, or any other processor capable of operating as described herein, or a combination of two or more single- or multi-core processors. Main memory unit 402 may be one or more memory chips capable of storing data and allowing any storage location to be directly accessed by the microprocessor 401, such as random access memory (RAM) of any type. In some embodiments, main memory unit 402 may include cache memory or other types of memory.

The computing device 400 may support any suitable installation device 416, such as a floppy disk drive, a CD-ROM drive, a CD-R/RW drive, a DVD-ROM drive, tape drives of various formats, USB/Flash devices, a hard-drive or any other device suitable for installing software and programs such as a server or application 403 such as a physical security application, network security application, or combination physical and network security application, or portion thereof. The computing device 400 may further comprise a storage device 428, such as one or more hard disk drives or redundant arrays of independent disks, for storing an operating system and other related software, and for storing application software programs.

Furthermore, the computing device 400 may include a network interface 418 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 418 may comprise a built-in network adapter, network interface card, PCMCIA network card, card bus network adapter, wireless network adapter, USB network adapter, cellular modem or any other device suitable for interfacing the computing device 400 to any type of network capable of communication and performing the operations described herein.

A wide variety of I/O devices 430a-430n may be present in the computing device 400. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 430 may be controlled by an I/O controller 423 as shown in FIG. 4. The I/O controller may control one or more I/O devices such as a keyboard 426 and a pointing device 427, e.g., a mouse, optical pen, or multi-touch screen. Furthermore, an I/O device may also provide storage 428 and/or an installation medium 416 for the computing device 400. The computing device 400 may provide USB connections to receive handheld USB storage devices such as the USB Flash Drive line of devices manufactured by Twintech Industry, Inc. of Los Alamitos, California.

The computing device 400 may comprise or be connected to multiple display devices 424a-424n, which each may be of the same or different type and/or form. As such, any of the I/O devices 430a-430n and/or the I/O controller 423 may comprise any type and/or form of suitable hardware, software embodied on a tangible medium, or combination of hardware and software to support, enable or provide for the connection and use of multiple display devices 424a-424n by the computing device 400. For example, the computing device 400 may include any type and/or form of video adapter, video card, driver, and/or library to interface, communicate, connect or otherwise use the display devices 424a-424n. A video adapter may comprise multiple connectors to interface to multiple display devices 424a-424n. The computing device 400 may include multiple video adapters, with each video adapter connected to one or more of the display devices 424a-424n. Any portion of the operating system of the computing device 400 may be configured for using multiple displays 424a-424n. Additionally, one or more of the display devices 424a-424n may be provided by one or more other computing devices, such as computing devices 400a and 400b connected to the computing device 400, for example, via a network. These embodiments may include any type of software embodied on a tangible medium designed and constructed to use another computer's display device as a second display device 424a for the computing device 400. One ordinarily skilled in the art will recognize and appreciate the various ways and embodiments that a computing device 400 may be configured to have multiple display devices 424a-424n.

A computing device 400 of the sort depicted in FIG. 4 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 400 may have different processors, operating systems, and input devices consistent with the device. For example, in one embodiment, the computer 400 is an Apple iPhone or Motorola Droid smart phone, or an Apple iPad or Samsung Galaxy Tab tablet computer, incorporating multi-input touch screens. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embodied in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, JavaScript, or in any byte code language such as JAVA or WebAssembly. The software programs may be stored on or in one or more articles of manufacture as object code.

What is claimed:

1. A system for augmented reality inventory analysis, comprising:
    a computing device comprising a processor, a display, a network interface, and an optical sensor;
    wherein the processor is configured to:
        identify an entity in an image captured by the optical sensor,
        select, from a reference library of candidate devices, a candidate device visually similar to the identified entity,
        retrieve, via the network interface from the entity based on the selection of the candidate device, a configuration of the entity, and
        render, via the display, an identification of the configuration of the entity as an overlay on a live image of the entity captured via the optical sensor.

2. The system of claim 1, wherein selecting a candidate device visually similar to the identified entity comprises generating a depth map from the image captured by the optical sensor, and comparing the generated depth map to a depth map of the candidate device; and
    wherein selecting the candidate device is performed responsive to the generated depth map matching the depth map of the candidate device.

3. The system of claim 2, wherein selecting the candidate device further comprises comparing a predetermined image associated with the candidate device to the image captured by the optical sensor; and
    wherein selecting the candidate device is further performed responsive to the image captured by the optical sensor matching the predetermined image.

4. The system of claim 1, wherein selecting a candidate device visually similar to the identified entity comprises extracting an alphanumeric identifier from the image captured by the optical sensor, and comparing the extracted identifier to an alphanumeric identifier of the candidate device.

5. The system of claim 4, wherein the alphanumeric identifier comprises a serial or model number; and wherein selecting the candidate device is further performed responsive to the extracted alphanumeric identifier matching the alphanumeric identifier of the candidate device.

6. The system of claim 1, wherein the processor is further configured to compare the retrieved configuration of the entity to a predetermined configuration, and render via the display, an identification of a difference between the retrieved configuration and the predetermined configuration as an overlay on the live image of the entity captured via the optical sensor.

7. A method for augmented reality inventory analysis, comprising:
    identifying, by a processor of a computing device, an entity in an image captured by an optical sensor of the computing device;
    selecting, by the processor from a reference library of candidate devices, a candidate device visually similar to the identified entity;
    retrieving, from the entity based on the selection of the candidate device, a configuration of the entity; and
    rendering, by the processor via a display of the computing device, an identification of the configuration of the entity as an overlay on a live image of the entity captured via the optical sensor.

8. The method of claim 7, wherein selecting a candidate device visually similar to the identified entity comprises generating a depth map from the image captured by the optical sensor, and comparing the generated depth map to a depth map of the candidate device; and
    wherein selecting the candidate device is performed responsive to the generated depth map matching the depth map of the candidate device.

9. The method of claim 8, wherein selecting the candidate device further comprises comparing a predetermined image associated with the candidate device to the image captured by the optical sensor; and
    wherein selecting the candidate device is further performed responsive to the image captured by the optical sensor matching the predetermined image.

10. The method of claim 7, wherein selecting a candidate device visually similar to the identified entity comprises extracting an alphanumeric identifier from the image captured by the optical sensor, and comparing the extracted identifier to an alphanumeric identifier of the candidate device.

11. The method of claim 10, wherein the alphanumeric identifier comprises a serial or model number; and wherein selecting the candidate device is further performed responsive to the extracted alphanumeric identifier matching the alphanumeric identifier of the candidate device.

12. The method of claim 7, further comprising comparing, by the processor, the retrieved configuration of the entity to a predetermined configuration, and rendering in real time via the display, an identification of a difference between the retrieved configuration and the predetermined configuration as an overlay on the live image of the entity captured via the optical sensor.

13. A non-transitory computer readable medium comprising instructions that, when executed by a processor of a computing device, causes the computing device to:

identify an entity in an image captured by an optical sensor of the computing device;

select, from a reference library of candidate devices, a candidate device visually similar to the identified entity;

retrieve, via a network interface from the entity based on the selection of the candidate device, a configuration of the entity; and render, via a display of the computing device, an identification of the configuration of the entity as an overlay on a live image of the entity captured via the optical sensor.

14. The computer readable medium of claim 13, further causing instructions to cause the computing device to generate a depth map from the image captured by the optical sensor, and compare the generated depth map to a depth map of the candidate device; and wherein selecting the candidate device is performed responsive to the generated depth map matching the depth map of the candidate device.

15. The computer readable medium of claim 13, further causing instructions to cause the computing device to:

compare the retrieved configuration of the entity to a predetermined configuration; and render in real time via the display, an identification of a difference between the retrieved configuration and the predetermined configuration as an overlay on the live image of the entity captured via the optical sensor.

* * * * *